May 5, 1964  E. R. THURSTON  3,131,732
WIRE TYING DEVICE

Filed Dec. 8, 1960  2 Sheets-Sheet 1

INVENTOR
EARL R. THURSTON
BY
Charles L. Lovercheck
attorney

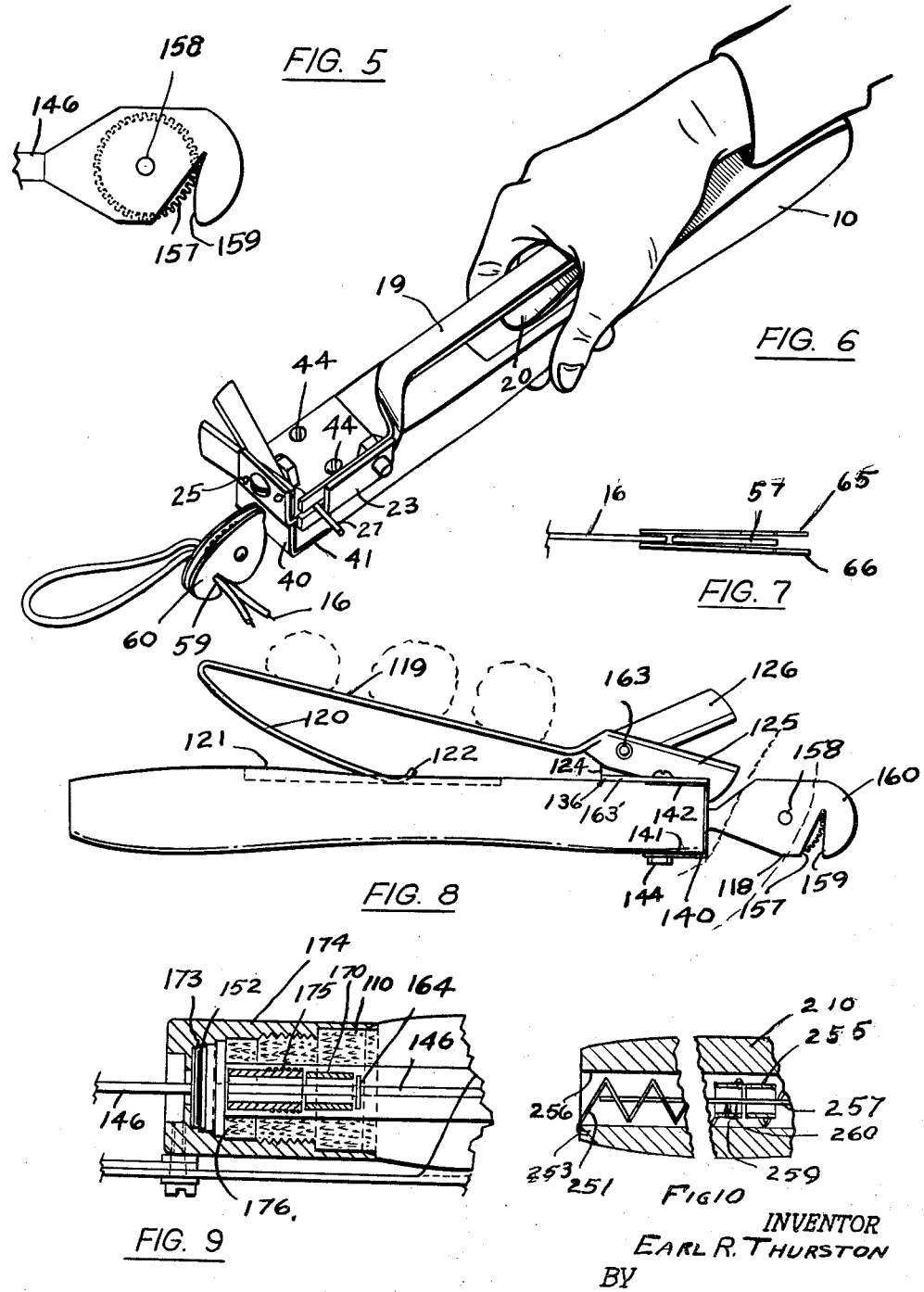

United States Patent Office 3,131,732
Patented May 5, 1964

3,131,732
WIRE TYING DEVICE
Earl R. Thurston, 16 Grant St., North East, Pa.
Filed Dec. 8, 1960, Ser. No. 74,677
8 Claims. (Cl. 140—119)

This invention relates to fastening tools and, more particularly, to tools for attaching grape vines to supporting wires or the like.

A serious problem encountered by grape vineyard owners after pruning the grape vines is the attaching of the canes to the supporting wires. The usual technique is to manually tie the canes to the wires with cord or wire. This necessitates the use of bare fingers of the operator which become numb in cold weather and it is difficult to use gloves during the tying operation which slows down the operation.

It is, accordingly, an object of this invention to overcome the disadvantages in prior processes of fastening grape vines to wires and the like and, more particularly, it is an object of this invention to provide a wire tying device which is simple in construction, economical to manufacture, and simple and efficient to use.

Another object of the invention is to provide an improved wire twisting tool.

A further object of the invention is to provide an improved tool for tying grape vines to wire.

With the above and other objects in view, the present invention consists of the combination and arrangement of parts hereinafter more fully described, illustrated in the accompanying drawings and more particularly pointed out in the appended claims, it being understood that changes may be made in the form, size, proportions, and minor details of construction without departing from the spirit or sacrificing any of the advantages of the invention.

In the drawings:

FIG. 5 is an enlarged partial view of the head of the tying tool shown in FIG. 8;

FIG. 6 is an isometric view of the tying tool shown in FIG. 3;

FIG. 7 is an end view of the tying tool shown in FIG. 3;

FIG. 8 is a side view of another embodiment of the invention;

FIG. 9 is a partial enlarged cross sectional view of the tying tool shown in FIG. 8; and FIG. 10 is a cross sectional view of another embodiment of the handle.

Figure 1:
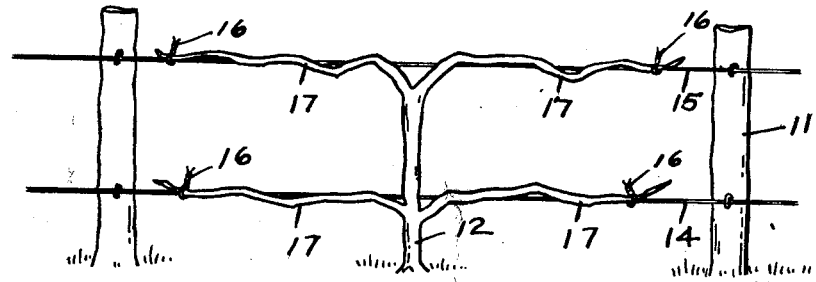
FIG. 1 is a view of a grape vine and supporting wires therefor shown generally schematically.

Now with more particular reference to the drawings, a grape support 11 is shown having spaced posts with upper and lower wires 15 and 14, respectively, to which canes 17 of a grape vine 12 are tied. Tie cords 16 pass around both the wires and the canes and are twisted together as indicated.

A tool handle 10 has a head 18, a lever 19, and a handle spring 20 which rests in a groove 21 and has an upwardly turned distal end 22 which rests in the groove 21. The spring 20 is compressed when the handle is squeezed and it urges the lever 19 to the position shown. The handle spring 20 is squeezed toward the handle 10 to shear a wire off between scissor blades 25 and 26.

A bracket 35 has a flat plate like portion which is fixed to the handle 10 by bolts 62 which pass through holes in the handle and overlie a flat portion 63 of the bracket 35. The bracket 35 also has a lateral leg 24 and a leg 36. The lever 19 is pivoted to the upwardly extending lateral leg 24 of the bracket 35. The lever 19 has an end 32 which extends generally parallel to the legs 24 and is slotted at 33 to receive an extension bar 27 of the blade 25. The extension bar 27 is fixed to the blade 25 by brazing or the like. The blade 26 is fixed to the vertical leg 36 of the bracket 35 by means of rivets 30 and 31 which pass through the holes in the blade and pass through holes in the vertically extending leg 36 of the bracket 35. Therefore, when the lever 19 is moved toward the handle 10 to compress the spring 20, the blades 25 and 26 will be swung together toward each other.

The head 18 is fixed to a spiral 46 and the spiral 46 freely extends through holes 45 in a U-shaped bracket 40. The spiral 46 is made of a flat bar which is twisted into the spiral. The U-shaped bracket 40 has legs 41 and 42 which lie alongside the handle and are fixed thereto by bolts extending through holes 44. The hole 45 in an intermediate part 43 of the bracket 40 rotatably receives the spiral 46. The spiral 46 extends through a rectangular hole 49 in a clutch plate 48 and has its inner ends attached to a spring 51 which has a hook which extends through a hole in the inner end of the spiral. The rectangular hole 49 is only slightly larger than the cross sectional area of the spiral 46 and its sides are convex to give a greater bearing surface on the spiral. The other end of the spring 51 is hooked into a hole in the end of a rivet 53. The spring acts as a guide for the spiral in the bore of the handle.

The head of the rivet 53 overlies the outer part of a washer 54 and the washer 54 is received in a counterbore 55 in the handle having a bore 56 which receives the spring 51 and the spiral 46. The clutch plate 48 has holes 50 which receive inwardly struck extensions 52 which are punched inwardly from holes 64 in the intermediate part of the U-shaped bracket. A washer 47 has a hole which receives the spiral 46 and the washer rests on the end of the handle 10 and allows the clutch plate 48 to rotate thereagainst after the spiral 46 has been extended.

The head 18 has a slot 59 therein which has an inner end curved at a radius slightly smaller than the outer radius of a toothed wheel 57. The toothed wheel 57 is received between two side plates 65 and 66 of the head 18 and rotates freely therebetween. The two side plates 65 and 66 are flared outwardly so that a wire being tied will be easily received therein. A nose 60 lies outwardly of the slot 59. The handle 10 may be made of wood. The other parts may be made of metal such as steel, brass, or other suitable material.

In operation, the operator will carry a spool of wire such as steel covered with a tissue paper protector and will allow the end thereof to extend around the cane and the wire 14 or 15. The wire preferably used is known in the trade as wire centered tissue. The operator's forefinger may be disposed over the end of the tool holding the head in place as shown in FIG. 6. The slot 59 could be disposed upward. The spaces between the wheels will receive the wire and clamp it. The finger of the operator will guide the wire into the slot.

The operator will hook the outer end of the wire and the bight thereof adjacent the wire roll and the vine in the slot 59 so that the vine and wire 14 are supported in a wire loop. He then moves the handle to bring the wire between the spool and the vine between the blades 25 and 26 and depresses the lever 19 which will shear off the wire. He will then hold the vine with one hand and pull on the handle 10 with the other. This will cause the clutch plate 48 to be pulled down against the extensions 52 which will enter the holes 50 and hold the clutch plate or disk 48 against rotation. Therefore, the spiral 46 will slide through the rectangular hole 49 and the head 18 will be rotated, thus twisting the wire in one rapid movement of the operator's hand.

When the operator releases the pressure on the handle, the clutch plate 48 will be pulled inwardly away from the extension 52 which will allow the head and spiral 46 to be drawn inwardly by the spring 51 without rotation. The washer 54 will allow the rivet 53 to rotate freely to relieve any torsional tension in the spring 51. The operator is then ready to unhook the head 18 from the wire and move on to the next tie position on the vine.

In the emobdiment of the invention shown in FIGS. 5, 8 and 9, similar numbers are usually used throughout the figures to refer to corresponding parts in FIG. 1 with one hundred added thereto to distinguish them.

In this embodiment, a handle 110 supports a head 160 which is carried on a spiral 146. The head 160 receives the wires having the paper thereon. This paper may be in the form of sheet material such as tissue paper wrapped around the wire to prevent the wire from cutting into the grape vine as in FIG. 1. The wire is received in a slot 159 in the head 160 and may be twisted in the same manner. An L-shaped bracket 136 has a horizontal leg 163' and a vertical leg 124.

The head 160 has a toothed wheel 157 therein supported on the head. A lever 119 has a spring 120 fixed thereto which is received in a slot 121 and has upturned ends 122 to cause the spring end to slide freely. The scissors blades in this embodiment are supported on the L-shaped bracket 136 which has the vertical or upstanding leg 124 on which a fixed blade 126 is fixed and to which a blade 125 is pivotally supported at 163.

Figures 2, 2A:
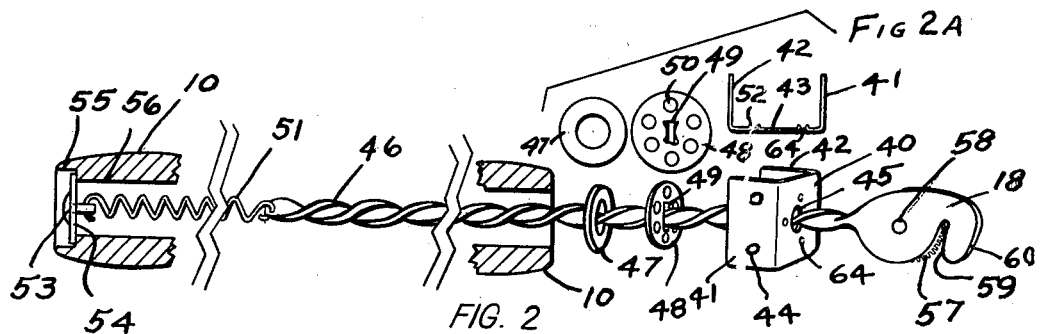
FIG. 2 is a longitudinal view of the tying tool showing the parts assembled thereon.
FIG. 2A is an exploded view showing some of the parts of the tying tool shown in FIG. 2.
Figure 3:
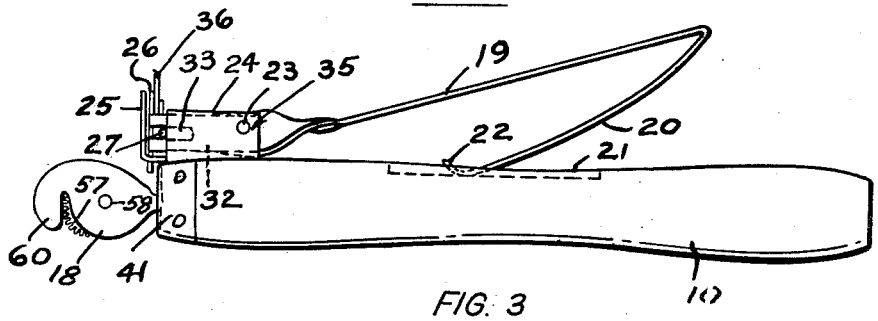
FIG. 3 is a side view of the tool.
Figure 4:
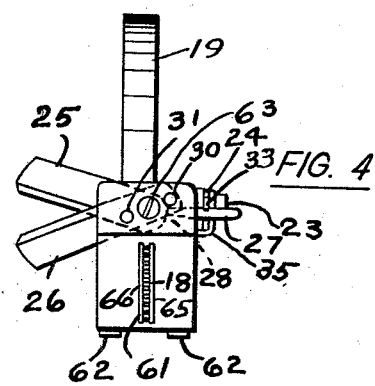
FIG. 4 is an end view of the tool.

The lever 119 is fixed to one end of the blade 125 by soldering, brazing, or the like and this swings the blade about the pivot 163 when the operator depresses the lever 119. The head is supported in a U-shaped bracket 140 similar to the bracket 40 in FIG. 2. The bracket 140 is fixed to the handle by a stud 144. The stud 144 also passes through a hole in the vertical leg of the L-shaped bracket 136 and holds it to the handle.

The spiral 146 freely passes through a hole in the bracket 140 through the opening in the handle and up through a sleeve 170. The clutch assembly made up of spaced washers 152 receives the spiral 146 and is loosely received in a counterbore 173 of the handle 110. A threaded cup 174 is threadably attached to the handle 110. The spiral 146 has the sleeve 170 thereon which rests against a spring 175 and is held thereagainst by a washer 164 which is fixed to the spiral 146. The spring 175 urges the washers 152 away from the handle 110 during the pulling stroke on the handle so that the spiral can rotate freely. On the return stroke, the washers are pulled into engagement with an end 176 of the member 110 and the frictional engagement thereof prevents the washer corresponding to the clutch plate 48 in FIG. 2 from rotating. Thus, after the wire is twisted, it will not be untwisted on the return stroke.

The U-shaped bracket 140 has legs 141 and 142 which receive the end of the handle 110. The wheel 157 is supported on the head 160 by a pivot 158 in the part 118 of the head which defines one side of the slot 159.

It will be seen in this embodiment that the scissors blades 125 and 126 are disposed generally in a plane parallel to the axis of the spiral 146. This makes the device more convenient to use in certain cases.

FIG. 10 shows another embodiment of the handle with a different means for attaching the spring to the spiral. The spiral is housed in a handle 210 similar to the member 10 in FIG. 6 and has a bore 256 therein. The bore 256 receives a helical spring 251 which is attached at 253 to the handle but having its end inserted in a smal hole therein. The other end of the spring 251 is wrapped around a sleeve 255 which freely rotates around a straight portion 257 of the spiral. The spiral is similar to the spiral 46 in FIG. 2 but its outer end is straight as shown and this part forms a guide in the helical spring 251.

A sleeve 259 is fixed to the straight portion 257 by a set screw 260 which is threadably received in the wall of the sleeve 259 and extends therethrough and firmly engages the portion 257. The sleeve 259 freely rotates inside the helical spring 251. Therefore, the spiral having the portion 257 can freely rotate in the helical spring and will not unwind the wire twisted in the head. This might occur in the embodiment shown in FIG. 2 if the rivet 53 stuck in the washer 54.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A tying device comprising a hollow handle,
   a flat member twisted into the form of a spiral having a width and a thickness and disposed in said hollow of said handle and extending part of the way therethrough with a first end of said spiral member in said handle and a second end outside said handle,
   a tension spring attached to said first end of said flat member and to said handle at a point spaced therefrom,
   a head having means thereon to receive a wire to be twisted,
   a first washer having an elongated slot non-rotatably receiving said flat member,
   the width of said elongated slot being slightly greater than the cross sectional width of said spiral member,
   a round washer having a round hole therein supported on said handle and rotatably receiving said spiral member,
   said first washer having spaced second holes therein disposed equidistant from the center of said first washer,
   and a bracket secured to said handle on the side of said first washer remote from said round washer and spaced therefrom,
   said first washer being received in the space between said round washer and said bracket coplanar therewith and movable from said round washer toward said bracket,
   said bracket having a round central opening rotatably receiving said spiral member,
   said bracket having inwardly extending members extending toward said first washer and terminating at a distance therefrom greater than the thickness of said first washer and registering with and entering said second holes when said first washer moves adjacent to said bracket,
   said first washer being adapted to move toward said round washer when said spiral is drawn into said handle by said spring,
   said first washer moving toward said bracket and said inwardly extending members entering said second holes holding said first washer against rotation when said spiral member is drawn outwardly whereby said spiral is rotated.

2. The device recited in claim 1 wherein said head is made of two spaced plate like members and a wheel having spaced teeth thereon is rotatably supported between said plate like members, the periphery of said wheel extending along one edge of a slot in said head and the teeth of said wheel extending into said slot, said teeth being spaced at least as far apart as the diameter of said wire to be twisted and adapted to wedge said wire between said teeth and said edge of said slot.

3. The device recited in claim 2 wherein a lever is attached to one of said blades, said lever diverging from said handle and being adapted to be forced toward said handle to operate said blades.

4. The device recited in claim 1 wherein said head comprises two spaced plate like members and means on said head comprises a slot in said spaced plate like members, and a toothed wheel between said spaced plate like members, the teeth of said wheel extending across a part of said second slot and adapted to clamp a wire to be twisted in said second slot.

5. The device recited in claim 4 wherein two intersecting blades of shears are attached to said handle and disposed generally perpendicular to the axis of said spiral.

6. The device recited in claim 4 wherein two intersecting blades of shears are supported on said handle and disposed generally parallel to the axis of said spiral.

7. The device recited in claim 6 wherein an elongated arm is attached to one blade of said shears and extends in divergent relation to said handle, and resilient means on the end of said arm engages said handle to urge said blades to open position.

8. The device recited in claim 7 wherein said spring is attached to said handle at said end remote from said spiral by means of a rivet rotatably supported on said handle and attached to said spring.

References Cited in the file of this patent

UNITED STATES PATENTS

| | | |
|---|---|---|
| 401,604 | Sutterley | Apr. 16, 1889 |
| 1,067,123 | Lyerla | July 8, 1913 |
| 1,119,223 | Beam | Dec. 1, 1914 |
| 1,387,249 | Foulder | Aug. 9, 1921 |
| 1,431,151 | Campbell | Oct. 10, 1922 |
| 1,920,056 | Briggs et al. | July 25, 1933 |
| 2,964,069 | Chappel et al. | Dec. 13, 1960 |

FOREIGN PATENTS

| | | |
|---|---|---|
| 128,147 | Australia | Nov. 2, 1945 |